(12) United States Patent
Bae et al.

(10) Patent No.: US 11,748,450 B2
(45) Date of Patent: Sep. 5, 2023

(54) METHOD AND SYSTEM FOR TRAINING IMAGE CLASSIFICATION MODEL

(71) Applicant: Pusan National University Industry-University Cooperation Foundation, Busan (KR)

(72) Inventors: Hye Rim Bae, Busan (KR); Hye Mee Kim, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 349 days.

(21) Appl. No.: 17/191,715

(22) Filed: Mar. 4, 2021

(65) Prior Publication Data

US 2022/0147771 A1    May 12, 2022

(30) Foreign Application Priority Data

Nov. 11, 2020  (KR) ........................ 10-2020-0150359

(51) Int. Cl.
*G06N 3/08*      (2023.01)
*G06F 18/21*     (2023.01)
*G06F 18/23213*  (2023.01)

(52) U.S. Cl.
CPC ...... *G06F 18/217* (2023.01); *G06F 18/23213* (2023.01); *G06N 3/08* (2013.01)

(58) Field of Classification Search
CPC ... G06F 18/217; G06F 18/23213; G06N 3/08; G06N 3/045; G06N 20/00; G06N 3/084;

(Continued)

(56) References Cited

U.S. PATENT DOCUMENTS 11,373,751 B2 *   6/2022  Selim ................... G06N 5/04
11,397,868 B2 *   7/2022  Woo ..................... G06N 20/00

(Continued)

FOREIGN PATENT DOCUMENTS

KR    10-2018-0037532 A    4/2018
KR    1020190088094 A      7/2019

(Continued)

OTHER PUBLICATIONS

H. Harkat et al., "GPR target detection using a neural network classifier designed by a multi-objective genetic algorithm," Applied Soft Computing Journal, 2019, pp. 310-325, vol. 79, Elsevier B.V.

(Continued)

*Primary Examiner* — Juan A Torres
(74) *Attorney, Agent, or Firm* — CANTOR COLBURN LLP

(57) ABSTRACT

A method and system for training an image classification model is disclosed. An aspect is to separate training processes of a feature value extraction model and an image classification model and train the feature value extraction model on a representative feature value suitable for image classification into a specific label value (e.g., "Peak"), thereby improving accuracy and performance of a classification model for a ground-penetrating radar (GPR) image that is captured by a GPR and is not easy for feature value extraction.

17 Claims, 8 Drawing Sheets

(58) Field of Classification Search
CPC .... G06V 10/776; G06V 10/82; G06V 10/763; G06V 10/764; G06V 10/803; G06V 10/40; G01S 13/89
USPC ........................................................ 382/156
See application file for complete search history.

(56) References Cited

U.S. PATENT DOCUMENTS

| | | | |
|---|---|---|---|
| 2020/0134455 A1* | 4/2020 | Choi | G06N 3/088 |
| 2022/0276374 A1* | 9/2022 | Zhang | G01S 13/885 |

FOREIGN PATENT DOCUMENTS

| | | |
|---|---|---|
| KR | 1020200052401 A | 5/2020 |
| KR | 102119136 B1 | 6/2020 |

OTHER PUBLICATIONS

Mathilde Caron et al., "Deep Clustering for Unsupervised Learning of Visual Features," Proceedings of the European Conference on Computer Vision (ECCV), 2018, 18 pages.

S. N. A. M. Kanafiah et al., "Metal shape classification of buried object using multilayer perceptron neural network in GPR data," IOP Conf. Series: Materials Science and Engineering, 2019, vol. 705, IOP Publishing Ltd.

Zhongming Xiang et al., "An Improved Convolutional Neural Network System for Automatically Detecting Rebar in GPR Data," Computing in Civil Engineering, 2019, 8 pages.

* cited by examiner (1) Artificial neural network  (2) K-means clustering

METHOD AND SYSTEM FOR TRAINING IMAGE CLASSIFICATION MODEL

CROSS-REFERENCE TO RELATED APPLICATION(S)

This application claims the benefit of Korean Patent Application No. 10-2020-0150359, filed on Nov. 11, 2020, in the Korean Intellectual Property Office, the disclosure of which is incorporated herein by reference.

BACKGROUND

1. Field of the Invention

One or more example embodiments relate to a method of training an image classification model (a feature value extraction model and a feature classification model) to improve a classification accuracy of a ground-penetrating radar (GPR) image collected through a GPR and, more particularly, to technology for establishing an image classification model based on feature value extraction using K-means clustering.

2. Description of the Related Art

In order to classify a ground-penetrating radar (GPR) image collected through a GPR by deep learning, various classification methodologies such as MLP, AlexNet, and RBF model based on a genetic algorithm are used. A basic model according to the classification methodology is used directly for image classification, or other artificial intelligence algorithms are additionally substituted for image classification.

In general, a deep learning-based model for image classification is composed of feature extraction and classification processes.

In related arts, to properly extract main features of an image, an autoencoder and a classification model are used in stages. For example, a process of outputting a feature value by compressing input data through an encoder of the autoencoder and a process of restoring original input data based on the output feature value through a decoder may be connected to perform training.

Also, in the related arts, a GPR image is clustered through a deep clustering model, and the clustering result is learned through ConvNet. This is for accurate classification of images, and is a method of classifying images with only features extracted from input image data. According to an example used in the related arts, a single K-means model that classifies 1,000 types of labels into 10,000 clusters is used.

Meanwhile, in terms of a B-scan image collected through a GPR, it is difficult to extract features therefrom properly. When GPR images having similar tendencies are to be categorized, the number of cases of the GPR image is very diverse and complex. For this reason, if an existing image classification model is used, high accuracy may not be achieved. Accordingly, there is a desire for a new learning method for improving accuracy and performance of a classification model for a GPR image, which is not easy for feature extraction.

SUMMARY

An aspect is to separate training processes of a feature value extraction model and an image classification model and train the feature value extraction model on a representative feature value suitable for image classification into a specific label value (e.g., "Peak"), thereby improving accuracy and performance of a classification model for a ground-penetrating radar (GPR) image that is captured by a GPR and is not easy for feature value extraction.

Another aspect is to determine, by using K-means clustering, a feature value having a minimum distance from a centroid feature value of a specific label value to which a GPR image is classified, among a plurality of feature values extracted from the GPR image to be a representative feature value so that a feature value extraction model outputting a feature value easy to be classified into the specific label value is established through learning of the representative feature value of the GPR image.

Another aspect is to perform training of a representative feature value on a feature value extraction model initialized by learning a label value of a GPR image before learning the representative feature value of the GPR image so that the learning of the representative feature value of the GPR image is performed in a state of being separated to some extent for each label value.

According to an aspect, there is provided a method of training an image classification model, the method including maintaining a plurality of ground-penetrating radar (GPR) image captured by a GPR in a database, establishing a feature value extraction model by primarily learning training data including a GPR image in the database and a representative feature value determined as one of feature values of the GPR image, wherein the feature value extraction model is a first model that outputs a feature value set of a new GPR image input to an image classification model, inputting a GPR image to the feature value extraction model and acquiring a feature value set of the GPR image output from the feature value extraction model, and establishing a feature value classification model by secondarily learning training data including the acquired feature value set of the GPR image and a label value to which the GPR image is classified, wherein the feature value classification model is a second model that outputs a label value of the new GPR image as a result value of the image classification model.

According to another aspect, there is also provided a system for training an image classification model, the system including a database in which a plurality of GPR images captured by a GPR is maintained, an extraction model establisher configured to establish a feature value extraction model by primarily learning training data including a GPR image in the database and a representative feature value determined as one of feature values of the GPR image, wherein the feature value extraction model is a first model that outputs a feature value set of a new GPR image input to an image classification model, an acquirer configured to input a GPR image to the feature value extraction model and acquire a feature value set of the GPR image output from the feature value extraction model, and a classification model establisher configured to establish a feature value classification model by secondarily learning training data including the acquired feature value set of the GPR image and a label value to which the GPR image is classified, wherein the feature value classification model is a second model that outputs a label value of the new GPR image as a result value of the image classification model.

According to example embodiments, it is possible to establish a feature value extraction model f(.) through primary learning of a representative feature value of a GPR image and then establish a feature value classification model g(.) through secondary learning of a feature value output by the feature value extraction model f, thereby providing an image classification model "L=g(f(X))" with increased accuracy of label value L classification for a GPR image X that is captured by a GPR and is not easy for feature value extraction.

According to example embodiments, it is possible to initialize a feature value extraction model by learning a label value of a GPR image before primarily learning a representative feature value of the GPR image so that the representative feature value of the GPR image at the time of primary learning is learned by the feature value extraction model in a state of being separated to some extent for each label value.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
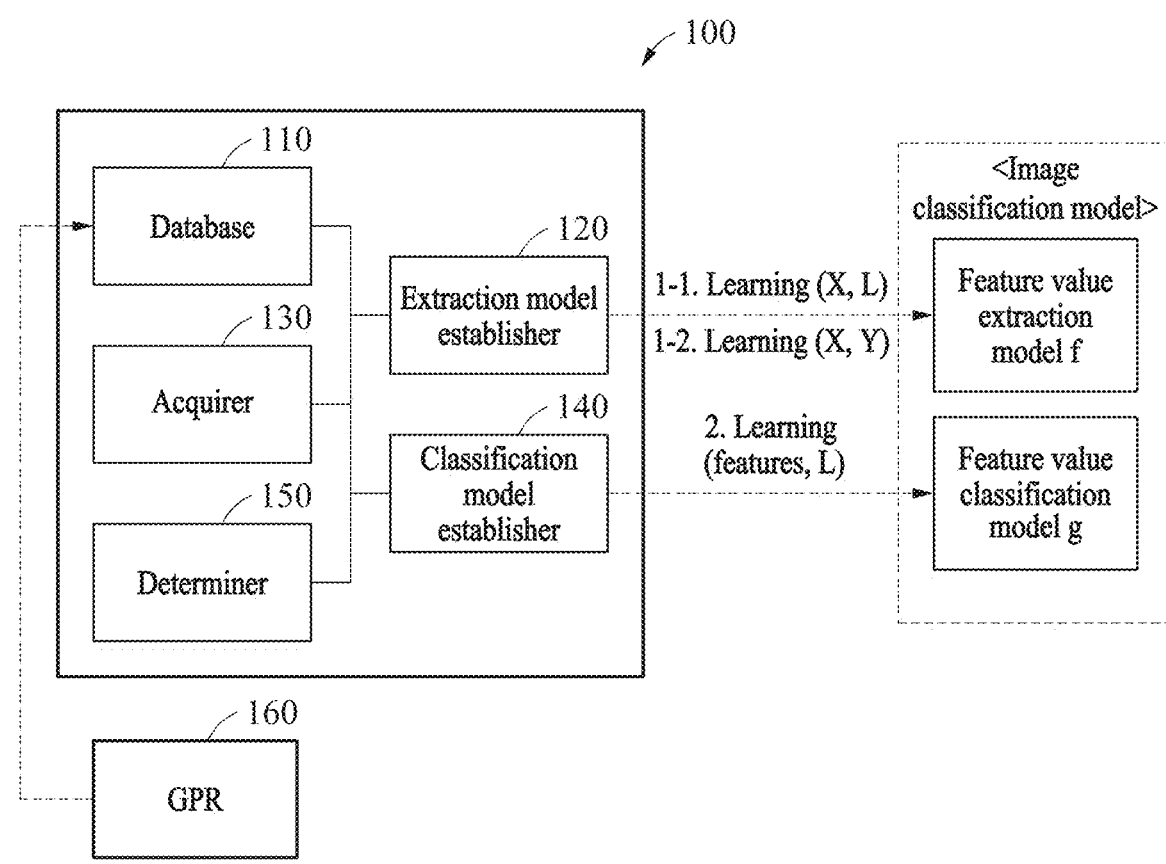
FIG. 1 is a block diagram illustrating an internal configuration of a training system of an image classification model according to an example embodiment of the present disclosure.

Hereinafter, example embodiments will be described in detail with reference to the accompanying drawings. However, it should be understood that these example embodiments are not construed as limited to the illustrated forms. Various modifications may be made to the example embodiments. Here, the examples are not construed as limited to the disclosure and should be understood to include all changes, equivalents, and replacements within the idea and the technical scope of the disclosure.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

FIG. 1 is a block diagram illustrating an internal configuration of a training system of an image classification model according to an example embodiment of the present disclosure.

Referring to FIG. 1, a training system 100 of an image classification model may include a database 110, an extraction model establisher 120, an acquirer 130, a classification model establisher 140, and a determiner 150.

An image classification model L=g(f(X)) established through training of the training system 100 may include a feature value extraction model (e.g., first model) f and a feature value classification model (e.g., second model) g.

The feature value extraction model f is a first model that has a new ground-penetrating radar (GPR) image X input to the image classification model as an input value and outputs a feature value "features=f(X)" output from the new GPR image X.

The feature value classification model g is a second model that has the feature value output from the feature value extraction model f as an input value and outputs a label value L obtained by classifying the new GPR image X as a result value of the image classification model.

To establish an image classification model that classifies a label value of a GPR image captured (collected, scanned) by the GPR 160, the training system 100 trains the feature value extraction model f and the feature value classification model g included in the image classification model using different training data, thereby establishing the image classification model with increased classification accuracy of the GPR image based on a feature value more suitable for image classification rather than an existing feature value suitable for image restoration.

The database 110 may maintain a plurality of GPR images X captured by the GPR 160.

The GPR 160 is a device used to detect an object above or below the earth's surface such as a pipe, a manhole, and the like. A GPR image of a target for classification of the present disclosure may be a B-scan image captured through the GPR 160.

The database 110 may be produced to include GPR images X of a plurality of classification targets captured by the GPR 160. The database 110 may also maintain a GPR image X captured by the GPR 160 in real time.

The database 110 may be implemented inside or outside the training system 100 of the image classification model. When the database 110 is implemented inside the GPR 160, the training system 100 of the image classification model may fetch a GPR image maintained in the database 110 through a network.

For example, the database 110 may maintain each of the plurality of GPR images in association with a representative feature value of each of the GPR image and a label value obtained by previously classifying each of the GPR images, as data for training.

When the plurality of GPR images classified into four label values "Left", "Peak", "Right", and "Other" is used for training based on a pattern of each of the GPR images, the determiner 150 may serve to determine a representative feature value of each of the plurality of GPR images using different K-means clustering models corresponding to a total number ("4") of label values into which the plurality of GPR images is to be classified.

Here, the representative feature value may refer to one or more feature values suitable for classifying the corresponding GPR image as one of the four label values rather than restoring the corresponding GPR image, among a plurality of feature values extracted from the GPR image.

In the present disclosure, four types of label values (e.g., rising, peak, descending, and others) are provided. In addition, four models, for example, a first K-means model for a label 1, a second K-means model for a label 2, a third K-means model for a label 3, and a fourth K-means model for a label 4 may be used to determine the representative feature value. A centroid obtained from each of the K-means models may be determined to be the representative feature value. In each of the K-means models, a number of representative feature values may be determined based on a value of K. For example, if K=1, one representative feature value may be determined.

For example, the determiner 150 may find a feature value that coincides with a centroid of the second K-means clustering model corresponding to the label 2 (e.g., "Peak") to which the GPR image is classified among the four label values "Left", "Peak", "Right", and "Other" or has a minimum distance from the centroid, thereby determining the found feature value to be the representative feature value of the GPR image.

As such, in the database 110, the representative feature value determined using the centroid obtained from the K-means clustering model based on each label value may be maintained and used as training data for establishing the feature value extraction model. Thus, by using features output from the feature value extraction model, the classification accuracy of the GPR image may be increased.

The extraction model establisher 120 may serve to establish feature value extraction model (first model) "f(.)" that outputs a set of features for a new GPR image input to the image classification model by primarily learning training data including the representative feature value determined as one of the features of the GPR image and the GPR image in the database 110.

For example, the extraction model establisher 120 may set the GPR image X in the training data to be an input value and set a representative feature value Y of the GPR image as an output value, thereby performing the primarily learning.

When the new GPR image X to be classified to a label value is input, the established feature value extraction model (first model) "f(.)" may output a feature value "features=f(X)" that is more suitable for classification among the plurality of feature values extracted from the new GPR image X.

In some cases, the extraction model establisher 120 may learn training data "(X, L)" including the GPR image and the label value of the GPR image before performing the primarily learning of training data "(X, Y)" including the GPR image and the representative feature value of the GPR image. In such cases, the primarily learning may be performed in a state in which the GPR image and the representative feature value of the GPR image are separated according to the label value of the GPR image learned through the training performed earlier.

Specifically, the extraction model establisher 120 may train a convolutional neural network (CNN) using the training data including the GPR image and the label value of the GPR image, initialize the feature value extraction model f, and allow the initialized feature value extraction model f to primarily learn the training data including the GPR image and the representative feature value of the GPR image.

The extraction model establisher 120 may initialize the feature value extraction model f through the training of the label value of the GPR image before the primarily learning, thereby allowing a representative value of the GPR image is learned with the label value of the GPR image learned to some extent. Through this, the training may be performed in a state in which the representative feature values are somewhat separated based on the label value rather than learning representative feature values randomly.

Figure 4:
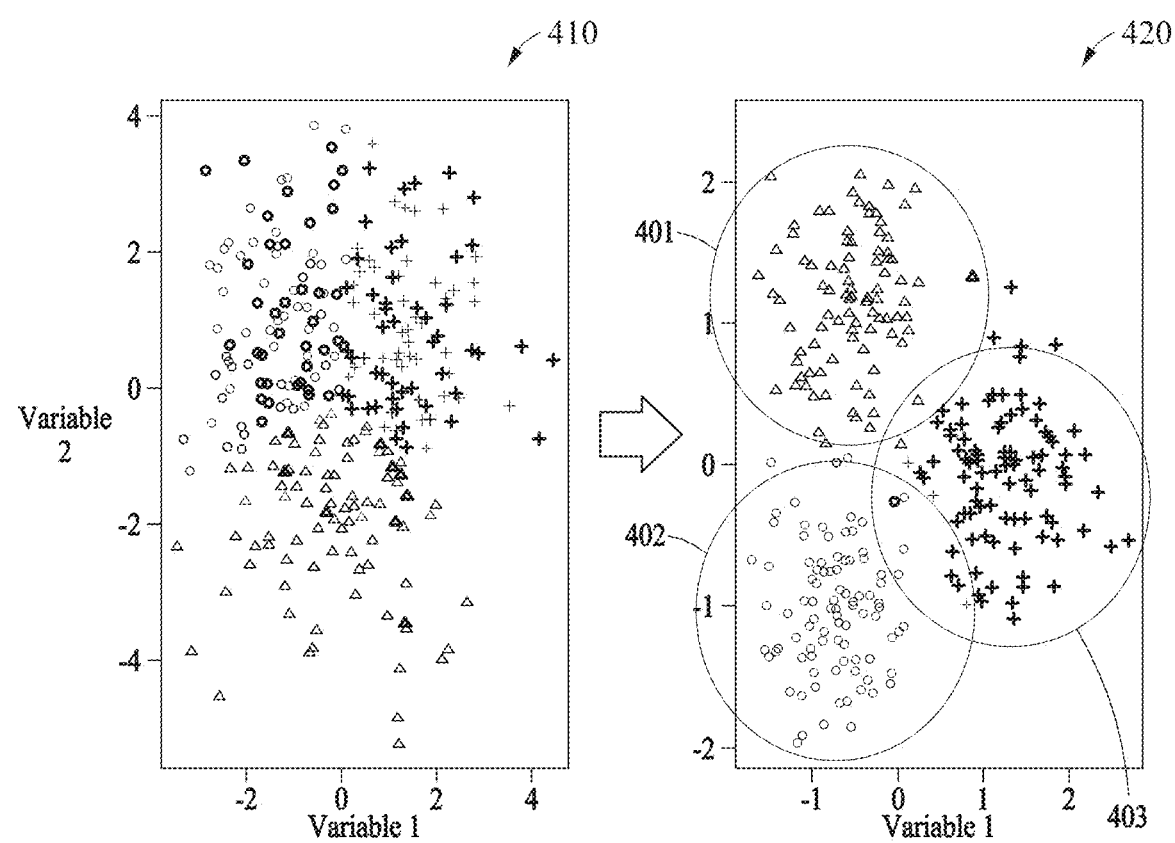
FIG. 4 is a graph illustrating a feature value distribution changing before and after initialization in a training system of an image classification model according to an example embodiment of the present disclosure.

For example, if the representative feature values are randomly learned, the training may be performed while a distribution of feature values is congested as shown in a feature value distribution 410 before initialization of FIG. 4. In this case, since a distance between the extracted centroids is not long, when all data is input to one model for classification, the classification performance may be degraded.

Accordingly, the extraction model establisher 120 may perform the training of the training data "(X, Y)" after the initialization of the feature value extraction model is performed through the training of the training data "(X, L)." Through this, the training may be performed in a state in which feature-specified distributions 401, 402, and 403 are somewhat separated as shown in a feature value distribution 420 after initialization of FIG. 4.

The acquirer 130 may serve to acquire a feature value set (features) of the GPR image output from the feature value extraction model f by inputting the GPR image to the feature value extraction model f established by the extraction model establisher 120.

Here, the acquired feature value set (features) may be used as an input value in a training process for establishing the feature value classification model (second model) g as described below.

The classification model establisher 140 may serve to establish the feature value classification model (second model) g that outputs a label value for the new GPR image as a result value of the image classification model by secondarily learning training data including a label value to which the GPR image is previously classified and the acquired feature value set (features) of the GPR image.

For example, the classification model establisher 140 may allow the CNN to perform the secondary learning on training data "(features, L)" including the label value of the GPR image and the feature value set of the GPR image, thereby establishing the feature value classification model g.

The established feature value classification model (second model) "g(.)" may output the label value L of the new GPR image X classified based on the feature value set (features) output by the feature value extraction model f. The output value of the feature value classification model g may be a result value of the image classification model ("L=g(features)", here "features=f(X)").

For example, when the new GPR image is input to the feature value extraction model f and the feature value set (features) associated with the GPR image is acquired by the acquirer 130, the classification model establisher 140 may establish the feature value classification model g that exhibits, among multiple K-means clustering models provided by the number of centroid feature values (label values) allocated for each label value to which all GPR images are to be classified, a distribution of a plurality of feature values in the acquired feature value set, in a distribution map showing a centroid of the second K-means clustering model corresponding to the label 2 to which the GPR image is classified, identifies, from the distribution map, a first centroid feature value having a minimum distance from the representative feature value of the new GPR image which is located at a relatively center among the plurality of features, and outputs a label value allocated to the first centroid feature value as a result of classification of the new GPR image.

The classification model establisher 140 may add the new GPR image to the database 110 as data for training by associating the representative feature value of the new GPR image with the label value to which the new GPR image is classified by the feature value classification model g.

Also, when the representative feature value of the GPR image maintained in the database 110 is updated in accordance with the data for training related to the new GPR image being added to the database 110 by the classification model establisher 140, the extraction model establisher 120 may perform the primarily learning using the updated representative feature value within a designated update episode, thereby applying the updated representative feature value to the feature value extraction model f.

As such, according to the present disclosure, it is possible to provide the image classification model with increased classification accuracy and performance for the GPR image captured by a GPR and not easy of feature value extraction, by establishing the feature value extraction model f through the primarily learning of the representative feature value of the GPR image and then establishing the feature value classification model g through the secondary learning of the feature value output by the feature value extraction model f, and initialize the feature value extraction model by previously learning the label value of the GPR image before the primarily learning of the representative feature value of the GPR image so that the feature value extraction model may learn the representative feature value of the GPR image in a state of being somewhat separated for each label value at the time of the primarily learning.

Figure 2:
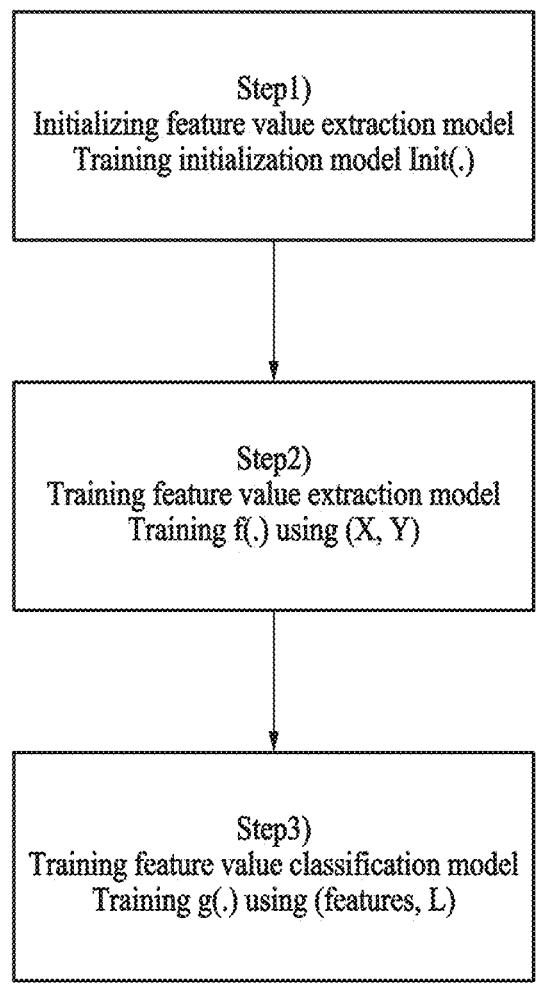
FIG. 2 is a diagram illustrating an overall training process of a training system of an image classification model according to an example embodiment of the present disclosure.

FIG. 2 is a diagram illustrating an overall training process of a training system of an image classification model according to an example embodiment of the present disclosure.

An image classification model for a GPR image to be established in the present disclosure may be designed according to the following equation having image data X as an input value and having a label value L to which the image data X is classified as an output value.

$$L=g(f(X))$$

The above equation includes functions f(.) and g(.). The function f(.) denotes a feature value extraction model that extracts a feature value (features) from the input image data. g(.) denotes a feature value classification model that outputs the label value L based on the feature value (features) output from f(.).

In general, the equation may be learned by learning training data including the image data X corresponding to the input value and the label value L corresponding to the output value at once. According to the present disclosure, the training system of the image classification model may perform sequential training of three steps by varying training data as illustrated in FIG. 2.

Step 1) is a process of initializing the feature value extraction model and, like a typical training process, is a process of learning the image data X and the label value L for the image data X.

For example, the training system of the image classification model may initialize the feature value extraction model by training "ResNet50", which is one of CNNs, using the training data (X, L) including the image data X and the label value L. An initialization model Init(.) of the feature value extraction model established through the training of (X, L) may be shown as an initialization model Init(.) 300 of FIG. 3.

Step 2) is a process of training the feature value extraction model, which is a process of learning by changing only the label value L of the training data of Step 1) to the representative feature value Y of the image data X.

In other words, the training system of the image classification model may train the initialization model Init(.) established in Step 1) using the training data (X, Y) including the image data X and the representative feature value Y, thereby establishing a feature value extraction model f(.).

Figure 5:
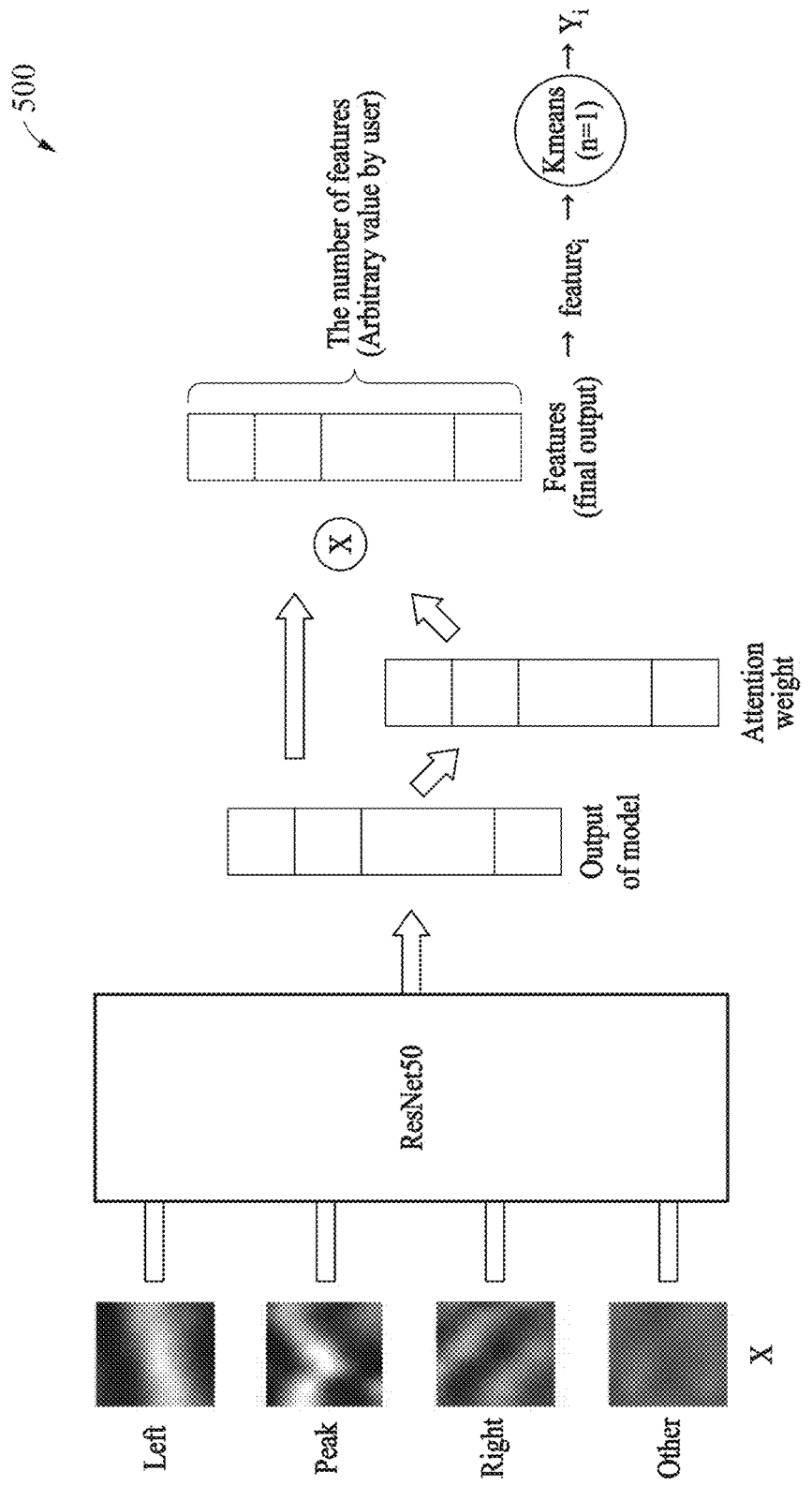
FIG. 5 is a diagram illustrating a structure of a feature value extraction model in a training system of an image classification model according to an example embodiment of the present disclosure.

The feature value extraction model f(.) established through the training of (X, Y) may be shown as a feature value extraction model 500 of FIG. 5, which has a difference in an output unit compared to the initialization model Init(.) (refer to the initialization model Init(.) 300 of FIG. 3) established in Step 1).

The representative feature value Y of the image data X used for the training of Step 2) may be a feature value determined using K-means among a plurality of feature values extracted from the image data X, determined as, for example, a feature value having a minimum distance from a centroid feature value of the label value L, and consistently updated in the training process. Thus, by using this, it is possible to induce feature value extraction in a desired direction.

As such, the representative feature value Y of the image data X may be determined as a feature value having a high degree of association with the label value L to which the image data X is classified. Thus, when the feature value extraction model f(.) established through such training of the representative feature value Y is used, that is, when the feature value (features) output from the feature value extraction model f(.) is input to the feature value classification model g(.), an accuracy of the label value L of the GPR image output from g(.) may be increased.

Step 3) is a process of training the feature value classification model g(.), which is a process of training using the feature value (features) of the image data X output in Step 2) and the label value L used for the training in Step 1).

For example, the training system of the image classification model may establish the feature value classification model g(.) by training "ResNet50", which is one of CNNs, using training data (features, L) including the feature value (features) and the label value L. The feature value classification model g(.) established through such training of (features, L) may be shown as a feature value classification model g 600 of FIG. 6.

For example, when the GPR image is to be classified using four label values "Left", "Peak", "Right", and "Other", a specific label value (e.g., "Peak") closest to a pattern (shape) in the input GPR image may be output by the feature value classification model g(.).

As such, the training system of the image classification model of the present disclosure may provide an image classification model (L=g(f(X))) with increased classification accuracy for the GPR image by a GPR which is not easy of feature value extraction, through the sequential training of the three steps.

Figure 3:
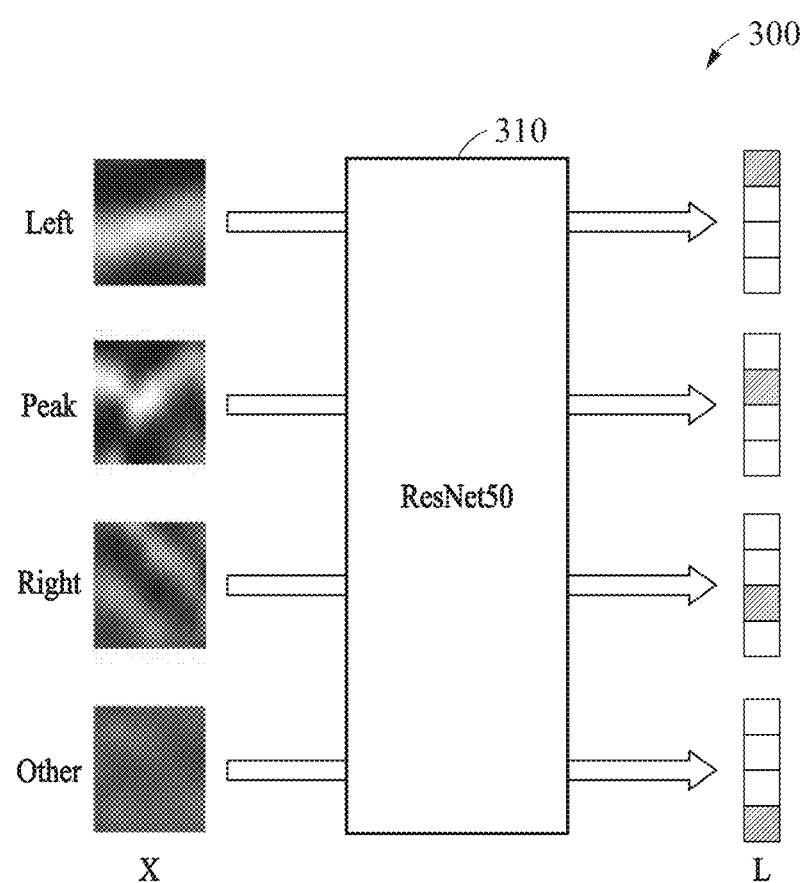
FIG. 3 is a diagram illustrating a structure of an initialization model of a feature value extraction model in a training system of an image classification model according to an example embodiment of the present disclosure.

FIG. 3 is a diagram illustrating a structure of an initialization model of a feature value extraction model in a training system of an image classification model according to an example embodiment of the present disclosure.

FIG. 3 illustrates an initialization model Init(.) 300 of a feature value extraction model f established through training of training data (X, L) using an existing model "ResNet50" 310. Here, an output unit of the initialization model Init(.) 300 may include units corresponding to a total number ("4") of label values L.

Referring to FIG. 3, a model used for initializing the feature value extraction model f is a basic model having a structure of the "ResNet50" 310, has an input size the same as the size of the GPR image, and has an output size the same as a total number of label values.

Here, the label value may have a structure converted through one-hot encoding and be learned in the same manner as general supervised learning.

For example, the training system of the image classification model may perform training while the image data X is set at an input end of the "ResNet50" 310 and the label value L of the image data X is set at an output end of the "ResNet50" 310, thereby establishing the initialization model Init(.) 300 of the feature value extraction model f.

When the below-described training of Step 2) is performed on the initialization model Init(.) 300 established through the training of the training data (X, L), the representative feature value Y of the image data X may be learned in a state of being somewhat separated based on the label value L.

FIG. 4 is a graph illustrating a feature value distribution changing before and after initialization in a training system of an image classification model according to an example embodiment of the present disclosure.

FIG. 4 illustrates a feature value distribution 410 before initialization in a left portion and a feature value distribution 420 after the initialization in a right portion.

Referring to FIG. 4, as shown in the feature value distribution 410 before initialization, since a distance between extracted centroids is not far in a state in which a distribution of feature values is congested, when all data is input to one model for classification, classification performance may be degraded.

Accordingly, a training system of an image classification model may perform initialization of a feature value extraction model through training of training data (X, L) of Step 1) and then perform training of a representative feature value Y of Step 2), so that distributions 401, 402, and 403 for each feature are rather separated compared to the feature value distribution 410 before initialization, as shown in the feature value distribution 420 after the initialization.

By using K-means clustering, the present disclosure is to establish a feature value extraction model f for deriving feature values that are classified as a group of the same label value if a distance between the feature values is short and classified as groups of different label values if a distance between the feature values is long. For this, it is necessary to perform training such that a distance between a feature value of the GPR image obtained from the feature value extraction model and a specific centroid of a label value of the corresponding GPR image is minimized.

In other words, the training of the representative feature value may be performed such that a feature value obtained through the GPR image having the same label value is distributed in a short distance and feature values obtained through GPR images having different label values are distributed in a long distance.

Accordingly, the present disclosure may initialize the feature value extraction model by performing the training of the training data (X, L) in Step 1) prior to Step 2), thereby performing training of the representative feature value on the feature value extraction model initialized by learning the label value earlier, so that the training of the representative feature value of the GPR image is performed in a state of being somewhat separated for each label value.

FIG. 5 is a diagram illustrating a structure of a feature value extraction model in a training system of an image classification model according to an example embodiment of the present disclosure.

FIG. 5 illustrates a feature value extraction model 500 established by training an initialization model Init(.) 300 established in FIG. 3 using training data (X, Y) including image data X and a representative feature value Y of the image data X obtained using K-means.

Referring to FIG. 5, an input unit of the feature value extraction model 500 is the same as an input unit of an existing model "ResNet50" 310 used in the model initialization of FIG. 3. In contrast, an output unit of the feature value extraction model 500 may be reconstructed to include three layers, for example, an "Output of model" layer, an "Attention Weight" layer, and a "features" layer.

First, a training system of an image classification model may remove a single-layer output unit including units corresponding to a total number ("4") of label values L from the existing model and provide the "Output of model" layer including units corresponding to a number of feature values determined by a user. In the "Output of model" layer, a result value output through the existing model may be maintained.

Next, the training system of the image classification model may provide the "Attention Weight" layer derived based on the result value of the "Output of model" layer. The "Attention Weight" layer may be configured as the same-sized layer as the "Output of model" layer and an attention weight, which is an importance of each result value output from the existing model, may be maintained in the "Attention Weight" layer.

Next, the training system of the image classification model may provide the "features" layer in which a feature value (features) corresponding to a final output obtained by multiplying the "Output of model" layer by the "Attention Weight" layer is maintained. A size of the "features" layer is the same as the size of the "Output of model" layer.

Here, the number of feature values may be defined as a predetermined integer that can represent the input GPR image and may be a value required to be tuned as a hyperparameter. For example, when a GPR image of a 50×50 size, the number of feature values may be arbitrarily defined as "10." In other words, the three layers attached to the output unit of the feature value extraction model 500 may each have units corresponding to the number of feature values.

Accordingly, through the established feature value extraction model 500, a feature value (feature$_i$) enlarged/reduced according to the importance may be output by applying the attention weight.

Table 1 shows a training process for establishing the feature value extraction model 500. The training herein refers to a process of training the initialization model Init(.) 300 established in FIG. 3 on the training data (X, Y) including the image data X and the representative feature value Y of the image data X obtained using K-means.

TABLE 1 for (1 to episodes)
    for i ← (1 to n)
        feature$_i$ = f(X$_i$)
        y$_i$ = centroid of k − means(n = 1|feature$_j$)
        Y$_i$' = {y$_{i1}$, y$_{i2}$, ... , y$_{in_j}$}   (y$_{ij}$ = y$_i$, j = 1,2, ... , n$_i$)
        update Y$_i$ using Y$_i$'
    train model f(.)using (X, Y)   update Y = {Y$_1$, ... , Y$_n$}

In Table 1, x$_i$ denotes a data set corresponding to label i, y$_i$ denotes a representative feature value to replace label i, and Y$_i$ denotes a set of representative feature values substituting i which is a label value of X$_i$ and matches X$_i$, respectively. In addition, x=[x$_1$, . . . , x$_p$] and Y={Y$_1$, Y$_2$, . . . , Y$_p$} correspond to all input and output values configured as one data set. Also, f(.) is the feature value extraction model 500 to be established through the training process of Table 1, and feature$_i$ is defined as a value output when X$_i$ is input in f(.). Also, episodes denotes a number of trainings, which is a number of times that Y$_i$ is updated, and n$_i$ denotes a number of label vales. In the present disclosure. "n" is assumed as "4."

In Table 1, first, X$_i$ is input in f(.) to acquire a value of feature$_i$.

After that, a K-means model (K-means "n=1") having one cluster is generated and trained based on the acquired value of feature$_i$.

After that, a centroid of the K-means model is determined to be a representative feature value y$_i$.

After that, Y$_i$ is updated with the acquired value y$_i$.

By performing the process on all label i, update Y={Y$_1$, . . . , Y$_n$} is acquired.

After that, the training is performed by setting update Y={Y$_1$, . . . , Y$_n$} to an output value and setting a data set X={X$_1$, . . . , X$_p$} as an input value.

a feature value extraction model f(.) 500 may be established by performing the training using update Y= {Y$_1$, . . . , Y$_n$} and x={x$_1$, . . . , X$_p$} the number of times designated as episodes.

The training system of the image classification model of the present disclosure extracts (determines) a representative feature value update Y={Y$_1$, . . . , Y$_n$} with respect to the data set x={X$_1$, . . . X$_p$} having the same label value through K-means, and the feature value output when the data set X={X$_1$, . . . , X$_p$} is input to the model f(.) in the model training process may minimize a distance of a representative value of the same label.

The training system of the image classification model of the present disclosure may classify label values using different K-means clustering models corresponding to the total number ("n=4") of label values instead of one K-means clustering model in the above-described process.

The training method using the K-means clustering model is an unsupervised learning method that classifies data by the number of K determined based on a distance between data and may not employ a previously defined label value so is not affected at all.

In the present disclosure, using the K-means clustering model is to quickly extract the representative feature value. In this instance, if "K" in each K-means clustering model is set to "1", one representative value may be obtained. A value of "K" may be changed based on the desired number of representative feature values to be obtained.

As such, according to the present disclosure, by using the K-means clustering, it is possible to determine, to be a representative feature value, a feature value having a minimum distance from a centroid feature value of a specific label value to which the GPR image is classified among a plurality of feature values extracted from the GPR image and train the feature value extraction model on a feature value suitable for image classification into the specific label value, that is, the representative feature value, thereby improving classification accuracy and performance of a classification model for the GPR image captured by the GPR and is not easy of feature value extraction.

Figure 6:
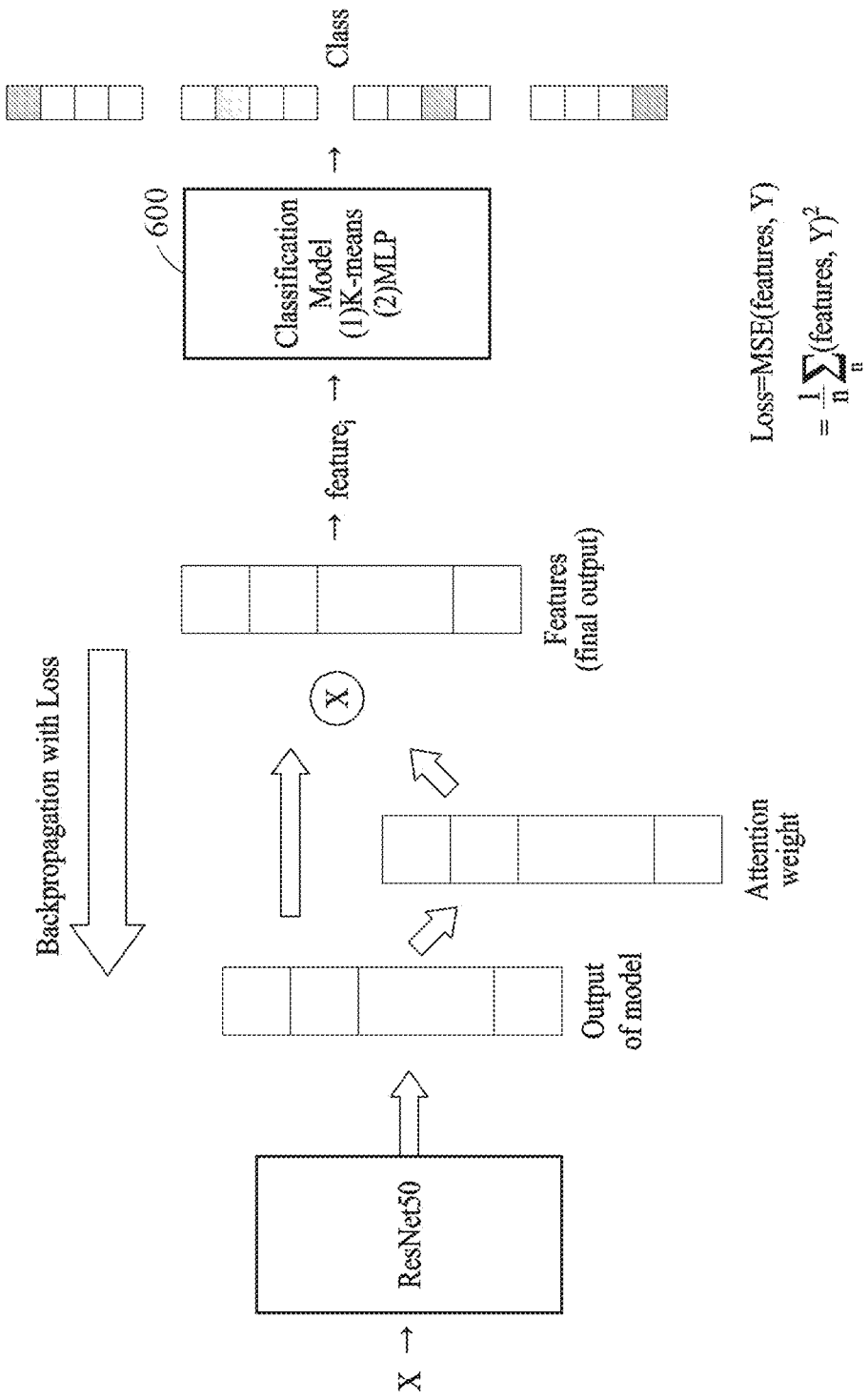
FIG. 6 is a diagram illustrating a structure of a feature value classification model in a training system of an image classification model according to an example embodiment of the present disclosure.
Figure 7:
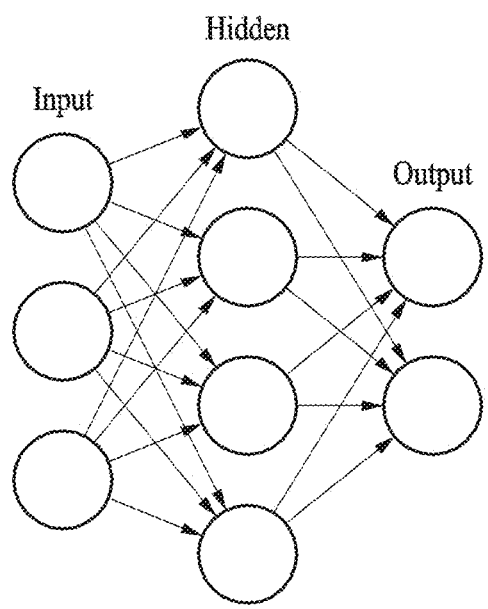
FIG. 7 is a diagram illustrating a training scheme used to classify feature values in a training system of an image classification model according to an example embodiment of the present disclosure.
Figure 7:
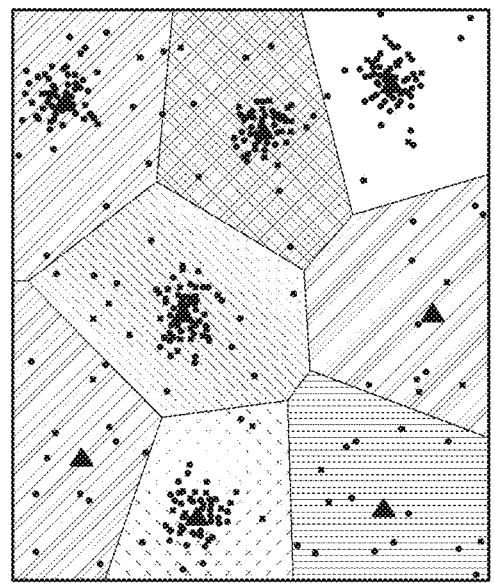

FIG. 6 is a diagram illustrating a structure of a feature value classification model in a training system of an image classification model according to an example embodiment of the present disclosure. FIG. 7 is a diagram illustrating a training scheme used to classify feature values in a training system of an image classification model according to an example embodiment of the present disclosure.

Referring to FIGS. 6 and 7, a training system of an image classification model may learn a feature value (features) extracted by the feature value extraction model f 500 of FIG. 5 based on (1) artificial neural network scheme of FIG. 7 or (2) K-means clustering scheme of FIG. 7, thereby establishing a feature value classification model g 600 of FIG. 6.

(1) artificial neural network scheme is a classification method using an artificial neural network corresponding to supervised learning, which is a model trained to perform classification of extracted feature values (features) based on a given label value L using the label value for the GPR image used in the above training process of FIG. 3.

(2) K-means clustering scheme is K-means which is the clustering method used in FIG. 5 and, in the present disclosure, the number of clusters of K-means may be defined as "4" which is the total number of the label values L. In this scheme, the classification may be performed using feature values (features) extracted through f(.) instead of using the label value L attached to the GPR image.

Figure 8:
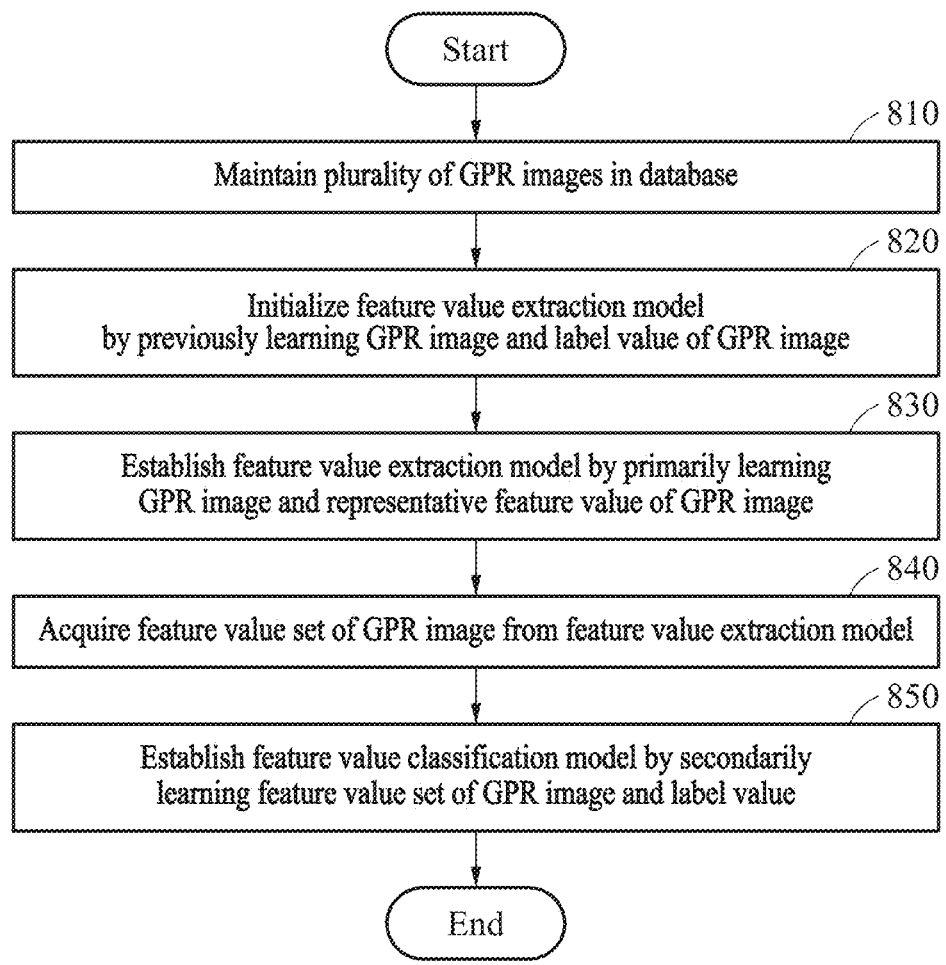
FIG. 8 is a flowchart illustrating a method of training an image classification model according to an example embodiment of the present disclosure.

FIG. 8 is a flowchart illustrating a method of training an image classification model according to an example embodiment of the present disclosure.

The method of training the image classification model according to the present example embodiment may be performed by the training system of the image classification model described above.

Referring to FIG. 8, in operation 810, the training system 200 of the image classification model maintains a plurality of GPR images X captured by a GPR in a database.

In operation 820, the training system 200 of the image classification model trains a CNN using training data including the GPR image and a label value of the GPR image, thereby initializing the feature value extraction model f.

In operation 830, the training system 200 of the image classification model establishes the feature value extraction model f by primarily learning training data including the GPR image in the database and a representative feature value determined as one of feature values of the GPR image.

In operation 840, the training system 200 of the image classification model acquires a feature value set (features) of the GPR image output from the feature value extraction model f by inputting the GPR image to the feature value extraction model f.

In operation 850, the training system 200 of the image classification model establishes a feature value classification model g that outputs a label value L of a new GPR image input in the image classification model, by secondarily learning training data including the acquired feature value set (features) of the GPR image and a label value to which the GPR image is classified in advance.

Specifically, the training system 200 of the image classification model may determine a representative feature value from a feature value set of the GPR image through K-means clustering and perform the secondary learning of a label value to which a centroid feature value having a minimum distance from the representative feature value is allocated as the label value of the GPR image, thereby establishing the feature value classification model g. Accordingly, through the established feature value classification model g, the label value L may be output based on the representative feature value of the new GPR image received as an input.

As such, according to the present disclosure, by establishing an image classification model "L=g(f(X))" based on feature value extraction using K-means clustering, classification accuracy and performance of a GPR image collected through a GPR may be improved.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of training an image classification model, the method comprising:
   maintaining a plurality of ground-penetrating radar (GPR) images captured by a GPR in a database;
   establishing a feature value extraction model by primarily learning training data comprising a GPR image in the database and a representative feature value determined as one of feature values of the GPR image, wherein the feature value extraction model is a first model that outputs a feature value set of a new GPR image input to an image classification model;
   inputting a GPR image to the feature value extraction model and acquiring a feature value set of the GPR image output from the feature value extraction model; and
   establishing a feature value classification model by secondarily learning training data comprising the acquired feature value set of the GPR image and a label value to which the GPR image is classified, wherein the feature value classification model is a second model that outputs a label value of the new GPR image as a result value of the image classification model.

2. The method of claim 1, further comprising:
   learning, before the primarily learning, training data comprising the GPR image and a label value of the GPR image, so that the primarily learning is performed in a state in which the GPR image and a representative feature value of the GPR image are separated based on the label value of the GPR image learned through the learning.

3. The method of claim 1, further comprising:
   initializing the feature value extraction model by training a convolutional neural network (CNN) using training data comprising the GPR image and a label value of the GPR image; and
   primarily learning, by the initialized feature value extraction model, training data comprising the GPR image and a representative feature value of the GPR image.

4. The method of claim 3, wherein the primarily learning comprises:
   setting the GPR image in the training data to be an input value of the initialized feature value extraction model, setting the representative feature value of the GPR image in the training data to be an output of the initialized feature value extraction model, and then performing the primarily learning.

5. The method of claim 1, wherein the establishing of the feature value classification model comprises:
secondarily learning, by a CNN, training data comprising the feature value set of the GPR image and a label value of the GPR image and establishing the feature value classification model.

6. The method of claim 1, further comprising:
determining, when each of the plurality of GPR images is classified as a label value of one of "Left", "Peak", "Right" and "Other" based on a pattern of each image, a representative feature value of each of the plurality of GPR images using different K-means clustering models corresponding to a total number of the label value,
wherein the maintaining in the database comprises:
maintaining, in the database, each of the plurality of GPR images in association with the representative feature value and the label value as data for training.

7. The method of claim 6, further comprising:
acquiring a feature value set associated with the GPR image by inputting the new GPR image to the feature value extraction model;
inputting the acquired feature value set to the feature value classification model:
presenting, by the feature value classification model, a distribution of a plurality of feature values included in the feature value set in a distribution map that shows a central feature value allocated to each label value for classifying an entire GPR image and identifying, in the distribution map, a first central feature value having a minimum distance from a representative feature value of the new GPR image distributed relatively at a center among the plurality of feature values;
outputting a label value allocated to the first central feature value from the feature value classification model as a classification result of the new GPR image; and
adding the new GPR image in association with the representative feature value of the new GPR image and a label value to which the new GPR image is classified, to the database as data for training.

8. The method of claim 7, further comprising:
applying, when a representative feature value of a GPR image maintained in the database is updated in response to the data for training related to the new GPR image being added in the database, the updated representative feature value to the feature value extraction model by performing the primarily learning using the updated representative feature value within a predetermined update count.

9. A non-transitory computer-readable storage medium storing instructions that, when executed by a processor, cause the processor to perform the method of claim 1.

10. A system for training an image classification model, the system comprising:
a database in which a plurality of ground-penetrating radar (GPR) images captured by a GPR is maintained:
an extraction model establisher configured to establish a feature value extraction model by primarily learning training data comprising a GPR image in the database and a representative feature value determined as one of feature values of the GPR image, wherein the feature value extraction model is a first model that outputs a feature value set of a new GPR image input to an image classification model;
an acquirer configured to input a GPR image to the feature value extraction model and acquire a feature value set of the GPR image output from the feature value extraction model; and
a classification model establisher configured to establish a feature value classification model by secondarily learning training data comprising the acquired feature value set of the GPR image and a label value to which the GPR image is classified, wherein the feature value classification model is a second model that outputs a label value of the new GPR image as a result value of the image classification model.

11. The system of claim 10, wherein the extraction model establisher is configured to learn, before the primarily learning, training data comprising the GPR image and a label value of the GPR image, so that the primarily learning is performed in a state in which the GPR image and a representative feature value of the GPR image are separated based on the label value of the GPR image learned through the learning.

12. The system of claim 10, wherein the extraction model establisher is configured to initialize the feature value extraction model by training a convolutional neural network (CNN) using training data comprising the GPR image and a label value of the GPR image, and primarily learn, by the initialized feature value extraction model, training data comprising the GPR image and a representative feature value of the GPR image.

13. The system of claim 12, wherein the extraction model establisher is configured to set the GPR image in the training data to be an input value of the initialized feature value extraction model, set the representative feature value of the GPR image in the training data to be an output of the initialized feature value extraction model, and then perform the primarily learning.

14. The system of claim 10, wherein the classification model establisher is configured to establish the feature value classification model by allowing a CNN to secondarily learn the feature value set of the GPR image and training data comprising a label value of the GPR image.

15. The system of claim 10, further comprising:
a determiner configured to determine, when each of the plurality of GPR images is classified as a label value of one of "Left", "Peak", "Right" and "Other" based on a pattern of each image, a representative feature value of each of the plurality of GPR images using different K-means clustering models corresponding to a total number of the label value,
wherein the database is configured to maintain each of the plurality of GPR images in association with the representative feature value and the label value as data for training.

16. The system of claim 15, wherein when the acquirer acquires a feature value set associated with the GPR image by inputting the new GPR image to the feature value extraction model, the classification model establisher is configured to:
establish a feature value classification model that presents a distribution of a plurality of feature values included in the feature value set in a distribution map that shows a central feature value allocated to each label value for classifying an entire GPR image, identifies, in the distribution map, a first central feature value having a minimum distance from a representative feature value of the new GPR image distributed relatively at a center among the plurality of feature values, and outputs a label value allocated to the first central feature value as a classification result of the new GPR image; and add the new GPR image in association with the representative feature value of the new GPR image and a label value to which the new GPR image is classified by the feature value classification model, to the database as data for training.

17. The system of claim 16, wherein when the classification model establisher updates a representative feature value of a GPR image maintained in the database in response to the data for training related to the new GPR image being added in the database, the extraction model establisher is configured to apply the updated representative feature value to the feature value extraction model by performing the primarily learning using the updated representative feature value within a predetermined update count.

\* \* \* \* \*